United States Patent
Benedyk et al.

(10) Patent No.: US 8,903,903 B2
(45) Date of Patent: Dec. 2, 2014

(54) METHODS, SYSTEMS, AND COMPUTER READABLE MEDIA FOR PROVIDING PRESENCE DATA FROM MULTIPLE PRESENCE INFORMATION PROVIDERS

(75) Inventors: Robby Benedyk, Angier, NC (US); Peter Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 830 days.

(21) Appl. No.: 12/484,857

(22) Filed: Jun. 15, 2009

(65) Prior Publication Data

US 2010/0017472 A1 Jan. 21, 2010

Related U.S. Application Data

(60) Provisional application No. 61/061,425, filed on Jun. 13, 2008, provisional application No. 61/061,464, filed on Jun. 13, 2008, provisional application No. 61/061,477, filed on Jun. 13, 2008.

(51) Int. Cl.
*H04L 29/08* (2006.01)
*H04L 12/58* (2006.01)

(52) U.S. Cl.
CPC .............. *H04L 67/24* (2013.01); *H04L 51/043* (2013.01); *H04L 51/20* (2013.01)
USPC ....................................................... 709/204

(58) Field of Classification Search
CPC ........ H04L 67/24; H04L 51/20; H04L 51/043
USPC .......................................... 709/203, 205, 206
See application file for complete search history.

(56) References Cited

U.S. PATENT DOCUMENTS

| | | | |
|---|---|---|---|
| 5,341,608 | A | 8/1994 | Mains, Jr. |
| 5,475,651 | A | 12/1995 | Bishop et al. |
| 5,579,371 | A | 11/1996 | Aridas et al. |
| 5,610,969 | A | 3/1997 | McHenry et al. |
| 5,774,668 | A | 6/1998 | Choquier et al. |

(Continued)

FOREIGN PATENT DOCUMENTS

| | | |
|---|---|---|
| CN | ZL 200680049126.1 | 12/2012 |
| EP | 1 511 267 A1 | 3/2005 |

(Continued)

OTHER PUBLICATIONS

Official Action for U.S. Appl. No. 11/120,324 (Oct. 19, 2000).

(Continued)

*Primary Examiner* — Kristie Shingles
(74) *Attorney, Agent, or Firm* — Jenkins, Wilson, Taylor & Hunt, P.A.

(57) ABSTRACT

Methods, systems, and computer readable medium for providing presence data from multiple presence information providers are disclosed. According to one aspect, the subject matter described herein includes a method for providing presence service using presence information from multiple presence information providers. The method includes, at a network node including at least one processor, receiving, from a message source, a first presence-related message that includes information identifying a user, using the information identifying a user to identify, from multiple presence information providers, a presence information provider that maintains presence information associated with the identified user, and relaying the first presence-related message to the identified presence information provider or sending a second presence-related message associated with the first presence-related message to the identified presence information provider.

41 Claims, 8 Drawing Sheets

(56) References Cited

U.S. PATENT DOCUMENTS

| | | | |
|---|---|---|---|
| 5,812,639 | A | 9/1998 | Bartholomew et al. |
| 5,999,525 | A | 12/1999 | Krishnaswamy et al. |
| 6,091,957 | A | 7/2000 | Larkins et al. |
| 6,091,959 | A | 7/2000 | Souissi et al. |
| 6,094,573 | A | 7/2000 | Heinonen et al. |
| 6,115,754 | A | 9/2000 | Landgren |
| 6,119,014 | A | 9/2000 | Alperovich et al. |
| 6,122,510 | A | 9/2000 | Granberg |
| 6,125,177 | A | 9/2000 | Whittaker |
| 6,128,304 | A | 10/2000 | Gardell et al. |
| 6,134,314 | A | 10/2000 | Dougherty et al. |
| 6,134,432 | A | 10/2000 | Holmes et al. |
| 6,181,937 | B1 | 1/2001 | Joensuu |
| 6,215,790 | B1 | 4/2001 | Voit et al. |
| 6,219,551 | B1 | 4/2001 | Hentilä et al. |
| 6,252,952 | B1 | 6/2001 | Kung et al. |
| 6,301,609 | B1 | 10/2001 | Aravamudan et al. |
| 6,304,565 | B1 | 10/2001 | Ramamurthy |
| 6,324,183 | B1 | 11/2001 | Miller et al. |
| 6,333,931 | B1 | 12/2001 | LaPier et al. |
| 6,363,411 | B1 | 3/2002 | Dugan et al. |
| 6,373,930 | B1 | 4/2002 | McConnell et al. |
| 6,424,647 | B1 | 7/2002 | Ng et al. |
| 6,430,176 | B1 | 8/2002 | Christie, IV |
| 6,446,127 | B1 | 9/2002 | Schuster et al. |
| 6,453,034 | B1 | 9/2002 | Donovan et al. |
| 6,456,845 | B1 | 9/2002 | Drum et al. |
| 6,470,179 | B1 | 10/2002 | Chow et al. |
| 6,515,997 | B1 | 2/2003 | Feltner et al. |
| 6,564,261 | B1 | 5/2003 | Gudjonsson et al. |
| 6,571,094 | B1 | 5/2003 | Begeja et al. |
| 6,611,516 | B1 | 8/2003 | Pirkola et al. |
| 6,639,981 | B1 | 10/2003 | Dunn, Jr. et al. |
| 6,704,287 | B1 | 3/2004 | Moharram |
| 6,718,178 | B1 | 4/2004 | Sladek et al. |
| 6,747,970 | B1 | 6/2004 | Lamb et al. |
| 6,760,343 | B1 | 7/2004 | Krishnamurthy et al. |
| 6,968,052 | B2 | 11/2005 | Wullert, II |
| 7,039,040 | B1 | 5/2006 | Burg |
| 7,058,036 | B1 | 6/2006 | Yu et al. |
| 7,146,181 | B2 | 12/2006 | Schaedler et al. |
| 7,171,216 | B1 | 1/2007 | Choksi |
| 7,209,968 | B1 | 4/2007 | Secer |
| 7,260,207 | B2* | 8/2007 | Marsico ............... 379/220.01 |
| 7,359,724 | B2 | 4/2008 | Torvinen |
| 7,701,925 | B1* | 4/2010 | Mason et al. .................. 370/352 |
| 7,751,825 | B2 | 7/2010 | Gogic |
| 7,840,636 | B2* | 11/2010 | Knauerhase et al. ......... 709/204 |
| 7,844,055 | B2 | 11/2010 | Mukherjee et al. |
| 7,870,196 | B2* | 1/2011 | Costa Requena ............. 709/206 |
| 7,903,637 | B2* | 3/2011 | Moore et al. .................. 370/352 |
| 7,907,713 | B2 | 3/2011 | Khadri |
| 7,924,787 | B2 | 4/2011 | Lee |
| 7,933,608 | B2 | 4/2011 | Tejani et al. |
| 7,983,657 | B2* | 7/2011 | Staack ....................... 455/414.1 |
| 8,019,335 | B2 | 9/2011 | Kallio |
| 8,108,345 | B2* | 1/2012 | Cox et al. ....................... 707/626 |
| 8,130,931 | B2* | 3/2012 | Murphy et al. .......... 379/215.01 |
| 8,176,087 | B2* | 5/2012 | John et al. ..................... 707/802 |
| 8,190,884 | B2* | 5/2012 | Alroy et al. ................... 713/155 |
| 8,204,052 | B2* | 6/2012 | Baldwin et al. ............... 370/389 |
| 8,204,194 | B2* | 6/2012 | Hyerle ...................... 379/201.01 |
| 8,234,559 | B2* | 7/2012 | Cox et al. ....................... 715/206 |
| 8,422,487 | B2 | 4/2013 | Mason et al. |
| 8,484,337 | B2* | 7/2013 | Maeda et al. ................. 709/224 |
| 8,527,600 | B2* | 9/2013 | Kakuta et al. ................. 709/207 |
| 8,577,004 | B2 | 11/2013 | Hans et al. |
| 2001/0024950 | A1 | 9/2001 | Hakala et al. |
| 2001/0031641 | A1 | 10/2001 | Ung et al. |
| 2001/0034224 | A1 | 10/2001 | McDowell et al. |
| 2001/0034237 | A1 | 10/2001 | Garahi |
| 2002/0058507 | A1 | 5/2002 | Valentine et al. |
| 2002/0061746 | A1 | 5/2002 | Jo et al. |
| 2002/0078209 | A1 | 6/2002 | Peng |
| 2002/0086672 | A1 | 7/2002 | McDowell et al. |
| 2002/0147845 | A1 | 10/2002 | Sanchez-Herrero et al. |
| 2002/0187781 | A1 | 12/2002 | Furlong |
| 2002/0193127 | A1 | 12/2002 | Martschitsch |
| 2003/0026289 | A1 | 2/2003 | Mukherjee et al. |
| 2003/0031160 | A1 | 2/2003 | Gibson Ang et al. |
| 2003/0065788 | A1* | 4/2003 | Salomaki ...................... 709/227 |
| 2003/0073440 | A1 | 4/2003 | Mukherjee et al. |
| 2003/0100326 | A1 | 5/2003 | Grube et al. |
| 2003/0148779 | A1 | 8/2003 | Aravamudan et al. |
| 2003/0177281 | A1 | 9/2003 | McQuillan et al. |
| 2003/0235180 | A1 | 12/2003 | Oprescu-Surcobe et al. |
| 2004/0003037 | A1 | 1/2004 | Fukimoto et al. |
| 2004/0015569 | A1 | 1/2004 | Lonnfors et al. |
| 2004/0047303 | A1 | 3/2004 | Fernandez et al. |
| 2004/0062383 | A1 | 4/2004 | Sylvain |
| 2004/0125790 | A1 | 7/2004 | Hiller et al. |
| 2004/0133641 | A1 | 7/2004 | McKinnon et al. |
| 2004/0153506 | A1 | 8/2004 | Ito et al. |
| 2004/0193686 | A1 | 9/2004 | Blagsvedt et al. |
| 2004/0203923 | A1 | 10/2004 | Mullen |
| 2005/0027867 | A1 | 2/2005 | Mueller et al. |
| 2005/0050157 | A1 | 3/2005 | Day |
| 2005/0070310 | A1 | 3/2005 | Caspi et al. |
| 2005/0074101 | A1 | 4/2005 | Moore et al. |
| 2005/0091387 | A1 | 4/2005 | Abe |
| 2005/0136952 | A1 | 6/2005 | Zabawskyj et al. |
| 2005/0143111 | A1 | 6/2005 | Fitzpatrick et al. |
| 2005/0143135 | A1 | 6/2005 | Brems et al. |
| 2005/0164682 | A1 | 7/2005 | Jenkins et al. |
| 2005/0202836 | A1 | 9/2005 | Schaedler et al. |
| 2005/0228895 | A1 | 10/2005 | Karunamurthy et al. |
| 2005/0266859 | A1 | 12/2005 | Tejani et al. |
| 2006/0068762 | A1 | 3/2006 | Baldwin |
| 2006/0112177 | A1 | 5/2006 | Barkley et al. |
| 2006/0140189 | A1 | 6/2006 | Wu et al. |
| 2006/0167978 | A1* | 7/2006 | Ozugur et al. ................. 709/203 |
| 2006/0244638 | A1 | 11/2006 | Lettau |
| 2006/0246880 | A1 | 11/2006 | Baldwin et al. |
| 2007/0127676 | A1 | 6/2007 | Khadri |
| 2007/0282911 | A1* | 12/2007 | Bantukul et al. ............ 707/104.1 |
| 2008/0137832 | A1* | 6/2008 | Heinze et al. ............ 379/220.01 |
| 2009/0069047 | A1 | 3/2009 | Russell et al. |
| 2009/0089322 | A1 | 4/2009 | Naaman |
| 2009/0233629 | A1 | 9/2009 | Jayanthi |
| 2009/0299985 | A1 | 12/2009 | Boberg et al. |
| 2010/0137002 | A1 | 6/2010 | Agarwal et al. |
| 2010/0205248 | A1 | 8/2010 | Mason et al. |
| 2013/0196601 | A1 | 8/2013 | Bobrow et al. |

FOREIGN PATENT DOCUMENTS

| | | |
|---|---|---|
| EP | 1 269 764 B1 | 7/2008 |
| JP | 2005057709 | 3/2005 |
| WO | WO 99/14910 | 3/1999 |
| WO | WO 00/35155 A1 | 6/2000 |
| WO | WO 01/45342 A2 | 6/2001 |
| WO | WO 01/56308 A2 | 8/2001 |
| WO | WO 01/72055 A2 | 9/2001 |
| WO | WO 03/032616 A1 | 4/2003 |
| WO | WO 2005/086966 A2 | 9/2005 |
| WO | WO 2005/086972 A2 | 9/2005 |
| WO | WO 2006/118755 A2 | 11/2006 |
| WO | WO 2007/050591 A2 | 5/2007 |
| WO | WO 2008/036645 A2 | 3/2008 |
| WO | WO 2009/152512 A2 | 12/2009 |

OTHER PUBLICATIONS

Interview Summary for U.S. Appl. No. 11/586,423 (Oct. 15, 2009).
Commonly assigned, co-pending U.S. Divisional Patent Application for "Presence Registration and Routing Node," (Unpublished, filed Apr. 19, 2010).
Interview Summary for U.S. Appl. No. 11/120,324 (Mar. 11, 2010).
Interview Summary for U.S. Appl. No. 11/077,711 (Mar. 4, 2010).
European Search Report for European application Mo. 08153801.9 (Jan. 27, 2010).
Notification of Transmittal of the International Search Report and the Written Opinion of the International Searching Authority, or the Declaration of PCT/US2009/047391 (Jan. 25, 2010).

(56) References Cited

OTHER PUBLICATIONS

Official Action for U.S. Appl. No. 11/586,423 (Jan. 6, 2010).
Official Action for U.S. Appl. No. 11/077,711 (Dec. 24, 2009).
Commonly-assigned, co-pending U.S. Appl. No. 12/624,974 for "Methods, Systems, and Computer-Readable Media for Providing Geo-Location Proximity Updates to a Presence System," (Unpublished, filed Nov. 24, 2009).
Wideberg et al., "Driving Traffic Data From a Cellular Network," World Congress on Intelligent Transport System and Services, World Congress on Intelligent Transport System and Services (13). No. 13. Londres, UK, Ertico, (2006).
Klyne, et al., "Common Presence and Instant Messaging (CPIM): Message," Network Working Group, RFC 3862, p. 1-23 (Aug. 2004).
Peterson, J., "Common Profile for Instant Messaging (CPIM)," Network Working Group, RFC 3860 (Aug. 2004).
Rosenberg et al., "SIP: Session Initiation Protocol," Network Working Group, FRC 3261 (Jun. 2002).
Saraswat et al., "The Presence Protocol," Internet-Draft, draft-saraswat-presenceprotocol-00.txt, p. 1-15 (Feb. 26, 1999).
Rosenberg et al., "SIP for Presence," IETF, draft-rosenberg-sip-pip-00.txt, p. 1-22 (Nov. 13, 1998).
Official Action for Divisional U.S. Appl. No. 12/762,908 (Apr. 14, 2011).
Chinese Offical Action for Chinese Patent Application No. 200680049126.1 (Feb. 24, 2011).
Supplemental Notice of Allowability for. U.S. Appl. No. 11/077,711 (Feb. 16, 2011).
Interview Summary for U.S. Appl. No. 11/120,324 (Mar. 1, 2011).
Official Action for U.S. Appl. No. 11/120,324 (Mar. 1, 2011).
Supplemental Notice of Allowability for U.S. Appl. No. 11/077,711 (Feb. 16, 2011).
Interview Summary for U.S. Appl. No. 11/077,711 (Dec. 21, 2010).
Notice of Allowance and Fee(s) Due for U.S. Appl. No. 11/077,711 (Dec. 20, 2010).
Interview Summary for U.S. Appl. No. 11/077,711 (Dec. 3, 2010).
Notice of Allowance and Fee(s) Due for U.S. Appl. No. 11/586,423 (Oct. 6, 2010).
European Search Report for European application No. 06826548.7 (Sep. 3, 2010).
Final Official Action for U.S. Appl. No. 11/077,711 (Jun. 23, 2010).
Final Official Action for U.S. Appl. No. 11/120,324 (Jun. 22, 2010).
Communication pursuant to Article 94(3) EPC for European application No. 08153801.9 (May 28, 2010).
Notice of Allowance and Fee(s) Due for U.S. Appl. No. 09/627,253 (Jul. 24, 2009).
Ex parte Quayle for U.S. Appl. No. 09/627,253 (May 7, 2009).
Communication regarding the expiry of the time limit within which notice of opposition may be filed for European Application No. 01920654.9 dated May 7, 2009.
Official Action for U.S. Appl. No. 11/586,423 (Apr. 29, 2009).
Final Official Action for U.S. Appl. No. 11/077,711 (Mar. 16, 2009).
Official Action for U.S. Appl. No. 11/120,324 (Jan. 21, 2009).
Notice of Abandonment for U.S. Appl. No. 09/627,253 (Nov. 12, 2008).
Office Action for U.S. Appl. No. 11/586,423 (Jul. 25, 2008).
Office Action for U.S. Appl. No. 11/077,711 (Jun. 26, 2008).
Notification of Transmittal of the International Search Report and the Written Opinion of the International Searching Authority, or the Declaration for International Application No. PCT/US2006/41451 (Jul. 7, 2008).
Office Action for U.S. Appl. No. 11/120,324 (Apr. 16, 2008).
Final Official Action for U.S. Appl. No. 09/627,253 (Apr. 4, 2008).
Notification of Transmittal of the International Search Report and the Written Opinion of the International Searching Authority, or the Declaration for International Application No. PCT/US06/13404 (Oct. 5, 2007).
Official Action for U.S. Appl. No. 09/627,253 (Sep. 20, 2007).
Restriction/Election Requirement for U.S. Appl. No. 09/627,253 (Jun. 14, 2007).
Communication pursuant to Article 96(2) EPC corresponding to European application No. 01 920 654.9 dated May 2, 2007.
Notice of Panel Decision for U.S. Appl. No. 09/627,253 (Apr. 2, 2007).
Notice of Allowance and Fee(s) Due for U.S. Appl. No. 10/798,924 (Oct. 3, 2006).
Official Action for U.S. Appl. No. 09/627,253 (Aug. 25, 2006).
Notification of Transmittal of the International Search Report and the Written Opinion of the International Searching Authority, or the Declaration for International Application No. PCT/US05/08258 (Aug. 16, 2006).
Notification of Transmittal of the International Search Report and the Written Opinion of the International Searching Authority, or the Declaration for International Application No. PCT/US05/08307 (Mar. 13, 2006).
Official Action for U.S. Appl. No. 10/798,924 (Feb. 23, 2006).
Advisory Action for U.S. Appl. No. 09/627,253 (Dec. 28, 2005).
Final Official Action for U.S. Appl. No. 09/627,253 (Jun. 2, 2005).
Notification of Transmittal of the International Search Report and the Written Opinion of the International Searching Authority, or Declaration for International Application No. PCT/US05/08307 (Mar. 11, 2005).
Official Action for U.S. Appl. No. 09/627,253 (May 19, 2004).
Restriction/Election Requirement for U.S. Appl. No. 09/627,253 (Jan. 9, 2004).
Campbell et al., "SIP Instant Message Sessions," p. 1 (Jun. 30, 2003).
Official Action for U.S. Appl. No. 09/627,253 (Apr. 28, 2003).
Interview Summary for U.S. Appl. No. 09/627,253 (Jan. 30, 2003).
Campbell et al., "Session Initiation Protocol (SIP) Extension for Instant Messaging," pp. 1-15 (Dec. 2002).
"3rd Generation Partnership Project; Technical Specification Group Services and Systems Aspects; Network Architecture (Release 5)," 3GPP TS 23.002, V5.7.0, p. 1-50, (Jun. 2002).
Sugano et al., "Presence Information Data Format for IMPP," Internet draft, draft-ietf-impp-pidf-01.text, Network Working Froup, p. 1-17, (Mar. 10, 2000).
Aggarwal et al., "Transport Protocol for Presence Information/Instant Messaging," Internet draft, draft-ietf-impp-pitp-mitp-01, Network Working Group, p. 1-21, (Mar. 9, 2000).
Day et al., "A Model for Presence and Instant Messaging," Request for Comments: 2778, Network Working Group, p. 1-17, (Feb. 2000).
Day et al., "Instant Messaging/Presence Protocol Requirements," Request for Comments: 2779, Network Working Group, p. 1-26, (Feb. 2000).
Stracke, J., "Message Information Data Format," Internet draft, draft-ietf-impp-midf-01.txt, Network Working Group, p. 1-4, (Jan. 19, 2000).
Tekelec, "IP7 Secure Gateway Release 1.0", Tekelec Release Documentation, 910-2046-01 Revision A (Nov. 1999).
Handley et al., "SIP: Session Initiation Protocol," Request for Comments: 2543, Network Working Group, p. 1-111, (Mar. 1999).
Handley et al. "SDP: Session Description Protocol," Request for Comments: 2327, Network Working Group, p. 1-42, (Apr. 1998).
Tekelec, "Feature Guide Eagle STP," P/N 910-1225-01 Revision B (Jan. 1998).
Tekelec, "Feature Guide LNP LSMS," P/N 910-1598-01 Revision A (Jan. 1998).
Notice of Granting Patent Right for Invention for Chinese Patent Application No. 200680049126.1 (Aug. 6, 2012).
Non-Final Official Action for U.S. Appl. No. 12/624,974 (Aug. 3, 2012).
Non-Final Official Action for U.S. Appl. No. 12/762,908 (Apr. 25, 2012).
Communication under Rule 71(3) EPC for European Application No. 08 153 801.9 (Apr. 23, 2012).
Notice of Allowance and Fee(s) Due for U.S. Appl. No. 11/120,324 (Feb. 22, 2012).
Noting of loss of rights pursuant to Rule 112(1) EPC for European Application No. 09763799.5 (Feb. 7, 2012).
Applicant-Initiated Interview Summary for U.S. Appl. No. 12/762,908 (Jan. 9, 2012).
Second Office Action of Chinese Patent Application No. 200680049126.1 (Dec. 6, 2011).

(56) References Cited

OTHER PUBLICATIONS

Final Official Action for Divisional U.S. Appl. No. 12/762,908 (Nov. 9, 2011).
Non-Final Official Action for U.S. Appl. No. 11/120,324 (Nov. 1, 2011).
Extended European Search Report for European Application No. 09763799.5 (Oct. 14, 2011).
Supplementary European Search Report for European application No. 05725442.7 (Aug. 16, 2011).
Interview Summary for Divisional U.S. Appl. No. 12/762,908 (Jun. 28, 2011).
Interview Summary for U.S. Appl. No. 12/762,908 (Aug. 23, 2012).
First Examination Report for Indian Application No. 2580/CHENP/2008 (Nov. 29, 2012).
Notice of Allowance and Fee(s) Due for U.S. Appl. No. 12/762,908 (Dec. 18, 2012).
Final Office Action for U.S. Appl. No. 12/624,974 (Feb. 6, 2013).
Notice of Grant for Indian Patent Application No. 2580/CHENP/2008 (Dec. 3, 2013).
Examination Report for Indian Patent Application No. 2580/CHENP/2008 (Oct. 31, 2013).
Notice of Allowance and Fee(s) Due for U.S. Appl. No. 12/624,974 (May 13, 2014).
Communication of European publication number and information on the application of Article 67(3) EPC for European Application No. 06826548.7 (Jun. 25, 2008).
Notification of European publication number and information on the application of Article 67(3) EPC for European Application No. 05725463.3 (Nov. 29, 2006).
Notification of European publication number and information on the application of Article 67(3) EPC for European Application No. 05725442.7 (Nov. 22, 2006).
Communication pursuant to Article 94(3) EPC for European Application No. 06 826 548.7 (Feb. 20, 2014).

* cited by examiner

METHODS, SYSTEMS, AND COMPUTER READABLE MEDIA FOR PROVIDING PRESENCE DATA FROM MULTIPLE PRESENCE INFORMATION PROVIDERS

RELATED APPLICATIONS

This application claims the benefit of U.S. Provisional Patent Application Ser. Nos. 61/061,425, 61/061,464, and 61/061,477, each filed on Jun. 13, 2008, and the disclosures of which are incorporated herein by reference in their entireties.

TECHNICAL FIELD

The subject matter described herein relates to communicating presence information in a computer network. More particularly, the subject matter described herein relates to methods, systems, and computer readable media for providing presence data from multiple presence information providers.

BACKGROUND

In computer networks, presence information is used to indicate a user's ability and/or willingness to communicate with other users, typically expressed as a "status". More precisely, however, presence information consists of an arbitrary number of elements, called presence tuples, where a tuple is a data object containing two or more components. Each presence tuple may consist of a status marker, an optional communication address, and an optional presence markup. Common presence status markers indicating the user's availability to communicate may include "online", "offline", "busy", "away", or "do not disturb". Presence information may also include positional or geolocation information, such as the current Cartesian coordinates or global positioning system (GPS) coordinates of a presentity. An optional communication address may include both a communication means and a contact address for the user. According to RFC 2778, one type of communication means defined by the presence information model is instant message (IM) service and one type of contact address is an instant inbox instant messaging systems, such as AOL, ICQ, MSN, and Google. Other types of communication means and contact addressed for use in a presence tuple may include various forms of telephony and telephone numbers.

Presence information may be managed via a presence client operating on the user's computer. Presence clients may send presence information via a network connection to a presence service, which stores the presence information to make it available for distribution to other users. For example, a presence service may store presence information for multiple users in one or more presence information databases. Presence information databases may distribute presence information to users within the same presence network or across network boundaries to users associated with other presence services. It is appreciated that a single human user may be associated with multiple presence services. This may be accomplished, for example, by operating multiple presence clients where each presence client is associated with a different presence service or, alternatively, by operating a multi-service presence client. When a user belongs to multiple presence services, each presence service may independently maintain presence information for the user. Accordingly, synchronization of presence information across multiple presence services is not required (i.e., a user may be both "online" in AOL and "away" in MSN).

Presence service users may be divided into two categories. A first set of users, called presentities, provides presence information to the presence service so that it may be stored and distributed to other users. The other set of users, called watchers, receives presence information from the presence service for keeping track of the status of one or more watched presentities. A user may be both a presentity and a watcher, as is often the case when two users wish to be updated as to the presence status of each other.

A presentity is any entity described by presence information, and typically refers to the human user of a presence client. A presentity can also refer to a group of entities, such as a collection of customer service agents in a call center. A multi-user presentity such as this may be considered available if there is at least one agent ready to accept a call. A watcher is any user who receives presence information associated with a watched presentity. The presence service may maintain watcher information associated with the activities of watchers related to fetching or subscribing to presence information.

Presence information may be distributed between watchers and presentities using either a subscription/notification model or a query/response model. In the query/response model, presence information updates are requested by a watcher. For example, a watcher may request current presence information for a presentity. The presentity's response may include updated presence information or may indicate that no presence information has changed. If the watcher queries a presentity at regular time intervals, this may be referred to as polling.

In the subscription model, changes to presence information are distributed to subscribers via notifications. For example, a watcher may subscribe to a presentity for instructing the presentity to automatically provide presence information updates to the watcher via notifications. Any changes to the subscribed presentity's status are included in a notification message and sent to the watcher. The subscription/notification model therefore reduces the burden on the watcher to periodically request presence information updates. Additionally, the subscription/notification model eliminates the transmission of response messages indicating that no presence information has changed, which may unnecessarily waste resources.

Depending on whether the query/response or the subscription/notification model is used to obtain presence information updates, watchers may be divided into two categories, called fetchers and subscribers. A fetcher is associated with the query response/model and requests the current value of some presentity's presence information from the presence service. In contrast, a subscriber is associated with the subscription/notification model and requests notification from the presence service of future changes to a particular presentity's presence information.

One problem associated with conventional presence services is that typically, each network/network service provider maintains presence information only for subscribers in its own network. When a subscriber of network A requests presence information for a subscriber of network B, a presence server on network A must somehow determine the address of a presence server on network B, if one exists, and route the presence query appropriately. This requires the presence server on network A to determine and maintain routing information to a number of presence servers on different networks. In addition, the presence server on network A must also determine which network the out-of-network subscriber belongs to.

Another problem associated with conventional presence services is that there may be different levels of cooperation or agreement between different networks. For example, networks A and B may mutually agree to charge no fee or a minimum fee for presence messages that go from A to B or vice versa, while networks A and C may charge higher fees, or possibly even prohibit presence messages that span the two networks. Thus, each network's presence server must maintain information about whether to allow or deny traffic from particular networks, and how much to charge for traffic that is allowed.

Yet another problem associated with conventional presence services is that two networks may use incompatible presence protocols, or incompatible versions of the same presence protocol. In order to facilitate exchange of presence information between the networks, conversion from one protocol to another may be needed.

While the problems just described may be overcome, it is usually at additional cost to the network. For example, the presence servers may be required to maintain additional databases or include additional functions. Since each presence server must maintain the same information, this gives rise to potential problems caused when two presence servers, whether in the same network or in two different networks, are out of synchronization with each other.

Accordingly, in light of these difficulties, there exists a need for methods, systems, and computer readable media for providing presence information from a plurality of presence information providers.

SUMMARY

According to one aspect, the subject matter described herein includes a method for providing presence service using presence information from multiple presence information providers. The method includes, at a network node including at least one processor, receiving, from a message source, a first presence-related message that includes information identifying a user, using the information identifying a user to identify, from multiple presence information providers, a presence information provider that maintains presence information associated with the identified user, and relaying the first presence-related message to the identified presence information provider or sending a second presence-related message associated with the first presence-related message to the identified presence information provider.

According to another aspect, the subject matter described herein includes a method for providing presence service using presence information from multiple network service providers. The method includes, at a network node including at least one processor, maintaining a collection of user presence data collected from multiple network service providers, and receiving, from a message source, a first presence-related message that includes information identifying a user. In response to receiving the first presence-related message, the network entity determines whether presence information associated with the identified user exists in the collection of user presence data. In response to a determination that presence information associated with the identified user exists in the collection of user presence data, the presence information associated with the identified user is retrieved and a second presence-related message that includes the presence information associated with the identified user is sent to the message source.

According to yet another aspect, the subject matter described herein includes a network entity for providing presence service using presence information from a plurality of presence information providers, the network entity including a communications network interface for receiving, from a message source, a first presence-related message that includes information identifying a user, and a presence service module implemented by at least one processor. The presence service module receives the first presence-related message from the communications module, uses the information identifying a user to identify, from a plurality of presence information providers, a presence information provider that maintains presence information associated with the identified user, and relays the first presence-related message to the identified presence information provider or sends a second presence-related message associated with the first presence-related message to the identified presence information provider.

According to yet another aspect, the subject matter described herein includes a universal presence server for providing presence service using presence information from a plurality of network service providers. The universal presence server includes a presence information database for storing and maintaining presence information collected from a plurality of network service providers and a universal presence service module that is implemented by at least one processor. The universal presence service module receives from a message source a first presence-related message that includes information identifying a user, and, in response to receiving the first presence-related message, determines whether presence information associated with the identified user exists in the presence information database. In response to a determination that presence information associated with the identified user exists in the presence information database, the universal presence service module retrieves the presence information associated with the identified user and sends to the message source a second presence-related message that includes the presence information associated with the identified user.

The subject matter described herein for providing presence service using presence information from a plurality of presence information providers may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for providing presence service using presence information from a plurality of presence information providers.

Figure 1A:
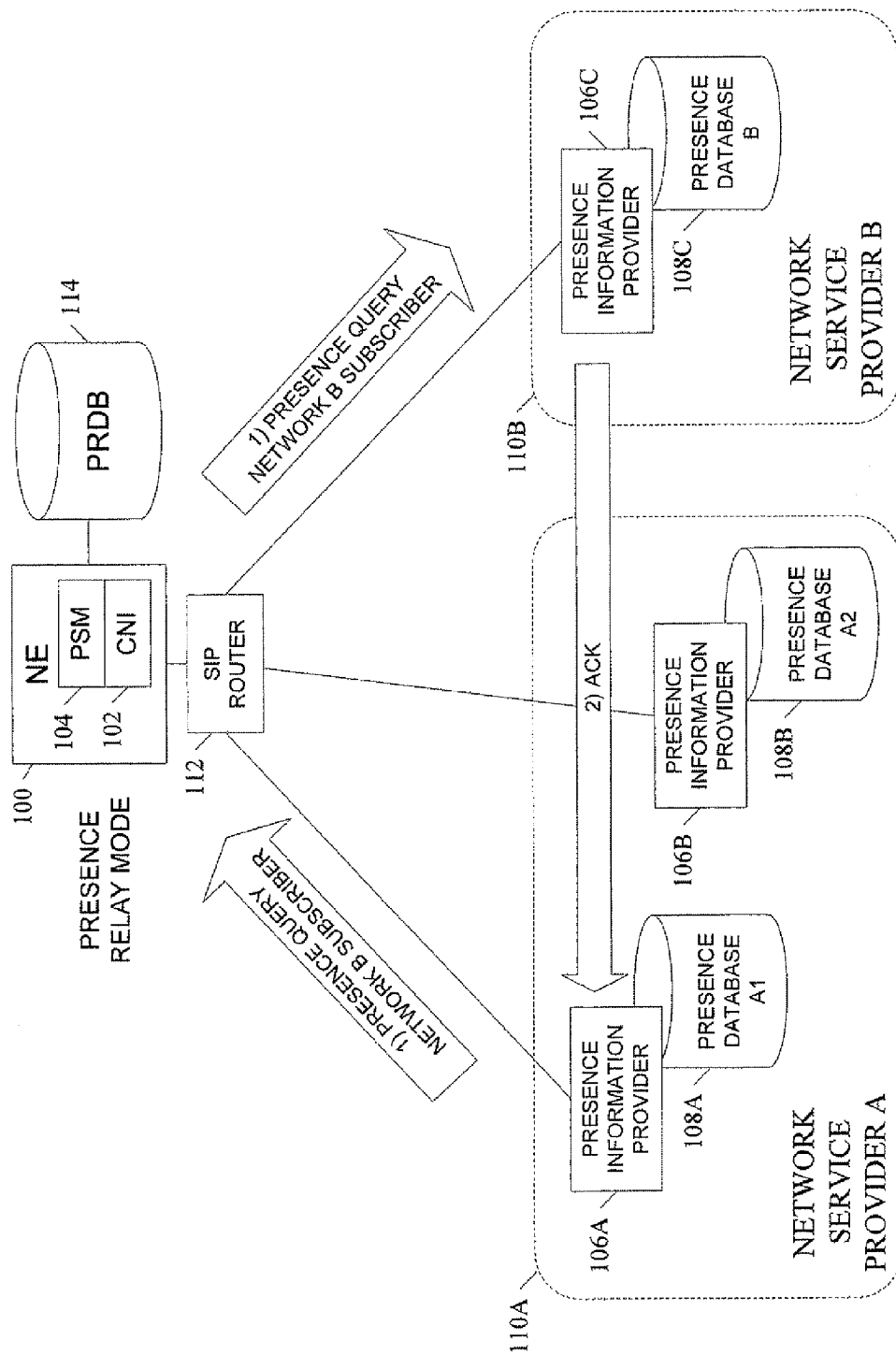
FIG. 1A is a block diagram illustrating a network entity for providing presence service using presence information from a plurality of presence information providers according to an embodiment of the subject matter described herein.

FIG. 1A is a block diagram illustrating a network entity for providing presence service using presence information from a plurality of presence information providers according to an embodiment of the subject matter described herein. Referring to FIG. 1A, network entity (NE) 100 includes a communications network interface (CNI) 102 for sending and receiving messages having a message source and including information identifying a user and a presence service module (PSM) 104, which receives presence-related messages from CNI 102 and uses the information identifying a user to identify, from multiple presence information providers (PIP) 106, a presence information provider (PIP) that maintains presence information associated with the identified user. A presence information provider may be an entity that provides or maintains presence information for one or more users, such as a presence server. In the embodiment illustrated in FIG. 1A, the presence-related messages may be session initiation protocol (SIP) messages, but in other embodiments, presence-related messages of other protocols may be used, including session initiation protocol for instant messaging and presence leveraging extensions (SIMPLE) messages, extensible messaging and presence protocol (XMPP) messages, and others. In one embodiment, presence service module 104 may be implemented by one or more processors, which may be executing suitable software or firmware programs. In one embodiment, the presence service providers may be presence servers.

In the embodiment illustrated in FIG. 1A, each presence information provider 106 may have its own presence information database 108, in which each provider stores presence information for users that are associated with the provider, e.g., subscribers to the network 110 that provides or hosts the presence information providers 106. As can be seen in the embodiment illustrated in FIG. 1A, each network 110 or network operator may host one or more presence information providers 106. For example, network A 110A may host two presence information providers 106A and 106B, while network B 110B may host just one presence information provider 106C. In such embodiments, NE 100 provides presence service to multiple network operators. This provides the benefit that each network operator does not need to know information about the identity or address of another network operator's presence information providers. Instead, each network operator only needs to know the address of NE 100, and may configure nodes within his or her network to send all presence-related messages to NE 100. In alternate embodiments, one network or network operator may host all of the presence information providers 106.

In one embodiment, NE 100 may use an E.164 number (ENUM) translation to determine the address of the presence information provider containing presence information associated with the identified user.

In the embodiment illustrated in FIG. 1A, NE 100 may be connected to networks 110 via an intermediate routing node, such as a session initiation protocol (SIP) router 112. In an alternative embodiment, NE 100 may be directly connected to networks 110 without an intermediate routing node. NE 100 receive presence-related messages from other types of network entities, such as media gateways, signaling gateways, security gateways, session border controllers, and so on. NE 100 may be media gateway, a signaling gateway, a security gateway, a session border controller, or other type of network node which can process presence-related messages.

In the embodiment illustrated in FIG. 1A, NE 100 may maintain a presence routing database (PRDB) 114, which it uses to identify which presence information provider 106 contains presence information for a particular user. PRDB 114 may be co-located within NE 100, or it may be located remotely from PRDB 114.

In the embodiment illustrated in FIG. 1A, NE 100 functions as a presence service relay, and relays a first presence-related message (FIG. 1A, message 1, hereinafter "M1") to the identified presence information provider, which sends an acknowledgement message (FIG. 1A, message 2, hereinafter "M2") to the sender of the first message. In this embodiment, NE 100 may be said to be operating in presence relay mode. In presence relay mode, the acknowledgement message is not sent to NE 100, but to the sender of the original message M1. In one embodiment, NE 100 may forward message M1 without modification. In an alternative embodiment, NE 100 may modify the original message M1, such as by changing the destination of the original message from NE 100 to the target presence information provider, e.g., PIP 106C, and forward the modified message to the target presence information provider. The operation of NE 100 in presence relay mode will be described in more detail in FIG. 3, below.

Figure 1B:
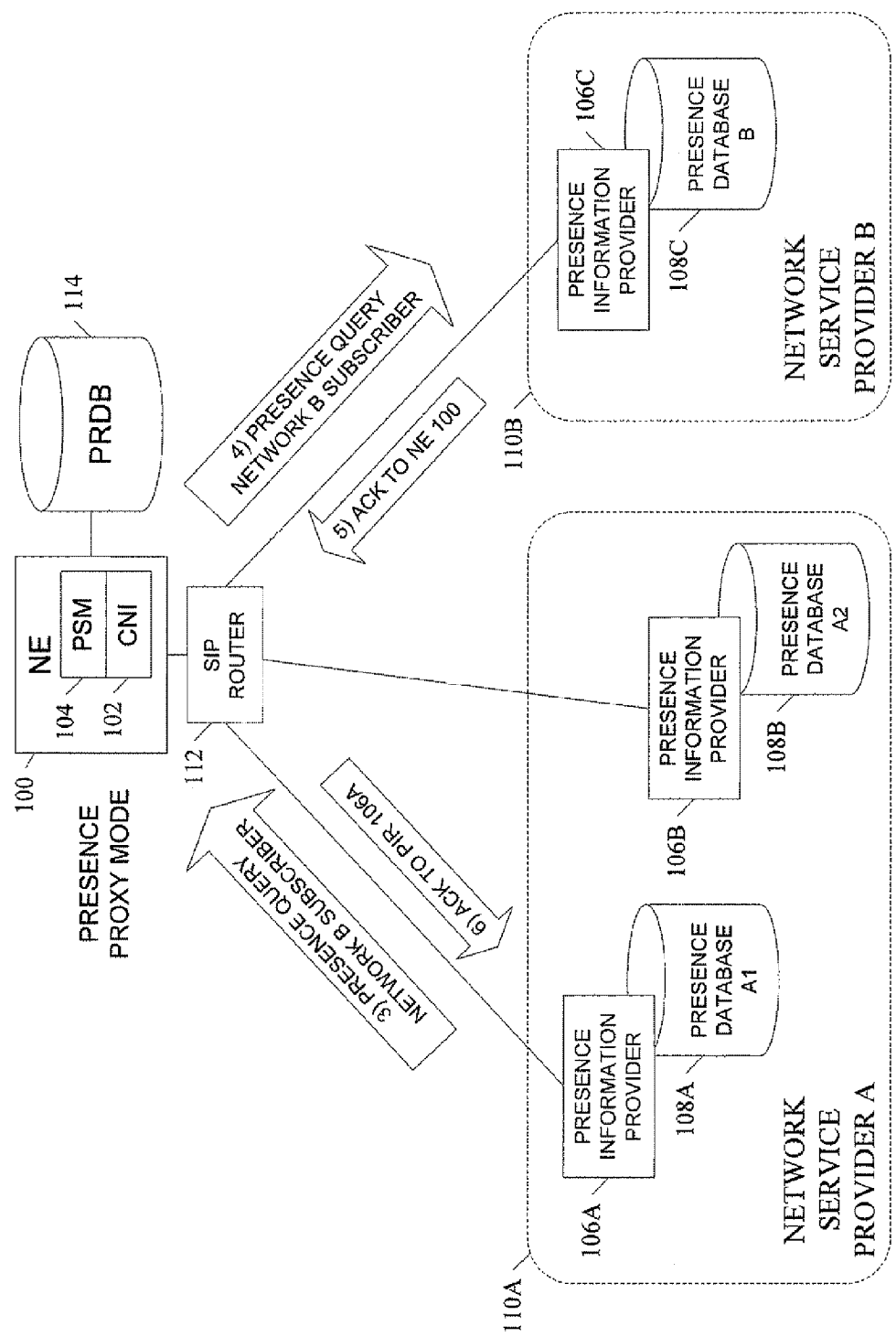
FIG. 1B is a block diagram illustrating a network entity for providing presence service using presence information from a plurality of presence information providers according to another embodiment of the subject matter described herein.

FIG. 1B is a block diagram illustrating a network entity for providing presence service using presence information from a plurality of presence information providers according to another embodiment of the subject matter described herein. Elements within FIG. 1B correspond to like-numbered elements within FIG. 1A, and their description will therefore not be repeated here.

In the embodiment illustrated in FIG. 1B, NE 100 functions as a presence service proxy, which receives a first presence-related message (FIG. 1B, message 3, hereinafter "M3") and then sends a second presence-related message associated with the first presence-related message (FIG. 1B, message 4, hereinafter "M4") to the identified presence information provider. In this embodiment, NE 100 may be said to be operating in presence proxy mode.

In this embodiment, NE 100 receives an ACK message (FIG. 1B, message 5, hereinafter "M5") in response to M4, and then sends another ACK message (FIG. 1B, message 6, hereinafter "M6") to the sender of the first message. NE 100 may send M6 either before or after NE 100 has received M5. For example, in one embodiment, NE 100 sends M6 immediately after receiving M3. This may be appropriate where M3 is a subscription request or other message that requires a simple ACK to acknowledge receipt of the subscription request or presence information query. In an alternative embodiment, NE 100 may wait for the receipt of M5 before sending out M6. This may be appropriate where M3 is a request for status or other message that expects more than just an ACK, but instead expects some specific data in return.

One benefit of presence proxy mode is that to the source of the presence-related message, e.g., the presence query originator, NE 100 appears to be the presence information provider, also referred to as a presence server. To the presence server, NE 100 appears to be the presence query originator. This has the effect that the identities of the presence information providers are hidden from the presence query originator. When NE 100 passes the results of the presence query or the response to the presence message back to the presence query originator, the identity of the presence server is not included in the information communicated from NE 100 to the presence query originator. One advantage to this form of security through obscurity is that it is more difficult for a malicious presence query originator to determine the identity, e.g., the network address, of a presence server or other node that the malicious presence query originator may intend to target for attack. The operation of NE 100 in presence proxy mode will be described in more detail in FIG. 4, below.

NE 100 may send, receive, or process various types of presence-related messages, including presence registration requests and presence registration request responses, presence status update requests and presence status update responses, presence status queries and presence status query responses, and presence subscription request and presence subscription request responses.

In one embodiment, NE 100 may perform additional valuable functions, such as: an authentication function, e.g., to authenticate the source of an incoming message; an authorization function, e.g., to determine if one user is authorized to subscribe to another; a firewall function, such as rejection of presence-related actions based on a blacklist, allowance of presence-related actions based on a whitelist, normalization of presence-related messages, and so on; an accounting, billing, or billing verification function; a usage measurements function; a protocol conversion or translation function, e.g., converting from one protocol to another protocol or from one version of a protocol to another version of the same protocol; a network interworking function, to allow messages from one network to enter another network; and an address translation function, such as mapping addresses from one domain into another domain, etc. in one embodiment NE 100 may administer service level agreements between multiple network operators. NE 100 may perform a data scrubbing function, in which non-standard or mal-formed presence-related messages are converted into a normalized or standard form before being sent or forwarded to the destination node.

Figure 2:
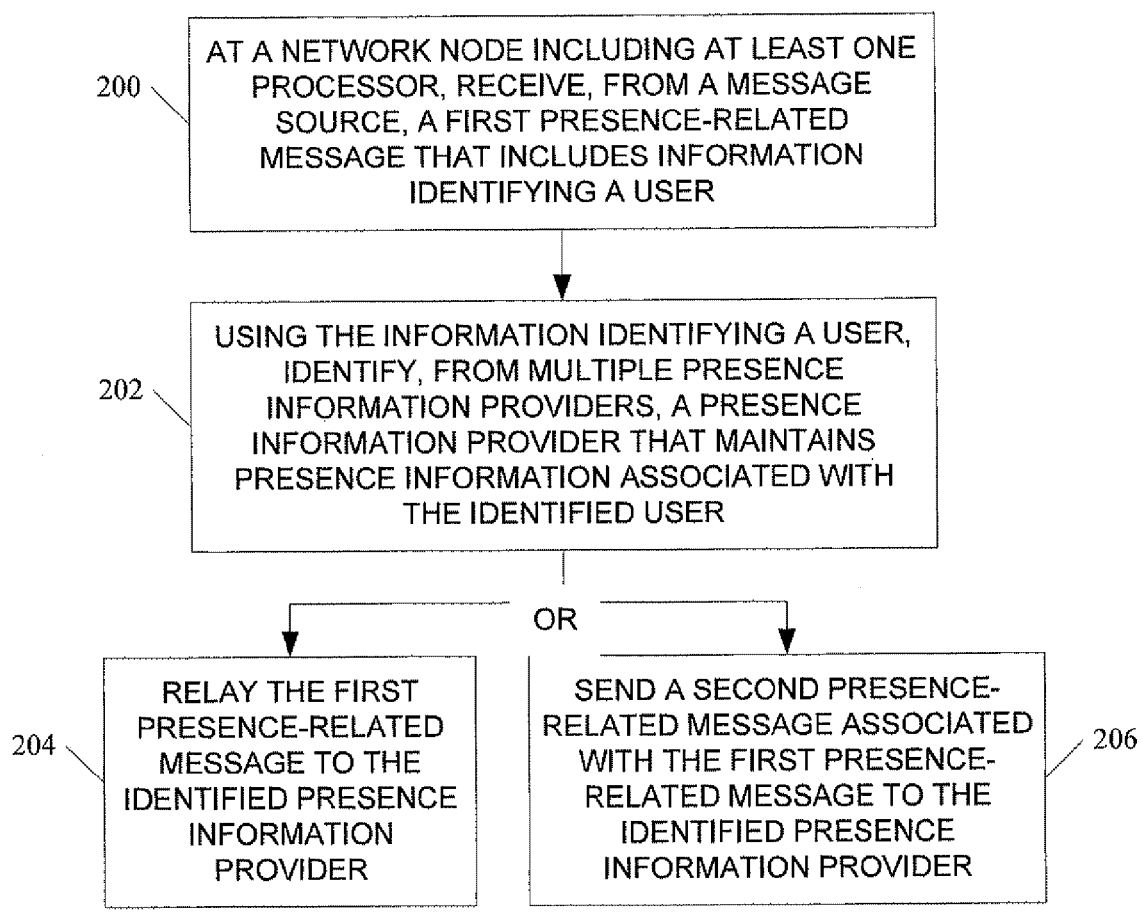
FIG. 2 is a flow chart illustrating an exemplary process for providing presence service using presence information from a plurality of presence information providers according to an embodiment of the subject matter described herein.

FIG. 2 is a flow chart illustrating an exemplary process for providing presence service using presence information from a plurality of presence information providers according to an embodiment of the subject matter described herein. This process will now be described with reference to FIGS. 1A, 1B, and 2.

At block 200, a first presence-related message is received at a network entity for processing presence-related messages. The first presence-related message is received from a message source and includes information identifying a user. For example, message M1 in FIG. 1A is a presence query sent from message source PIP 106A to NE 100. M1 may be a request to subscribe to receive presence information for a user that happens to be a subscriber to network B 110B. M1 may include the name of the user or other information that identifies the user.

At block 202, the information identifying the user is used to identify, from among multiple presence information providers, a presence information provider that maintains presence information associated with the identified user. For example, PSM 104 may use PRDB 114 to determine that the identified user is a subscriber of network B 110B, and that presence requests for subscribers of network B 110B should be routed to PIP 106C. If NE 100 is operating in presence relay mode, the process flow moves to block 204. If NE 100 is operating in presence proxy mode, the process flow moves to block 206.

At block 204, NE 100 is operating in presence relay mode and therefore relays or forwards the first presence-related message (e.g., M1) to the identified presence information provider (e.g., PIP 106C.) As stated above, M1 may be forwarded with or without modification.

At block 206, NE 100 is operating in presence proxy mode and therefore sends a second presence-related message associated with the first presence related message to the identified presence information provider. For example, referring to FIG. 1B, NE 100 may receive a first presence-related message (e.g., M3) that includes information identifying a user that is a subscriber of network B 110B, and send a second presence-related message (e.g., M4) that is associated with the first presence-related message (e.g., M3) to the identified presence information provider (e.g., 106C.) PIP 106C may respond to M4 by sending a response message (e.g., ACK M5) to NE 100. NE 100 may respond to M3 by sending a response message (e.g., ACK M6) to the message source (e.g., PIP 106A).

Figure 3:
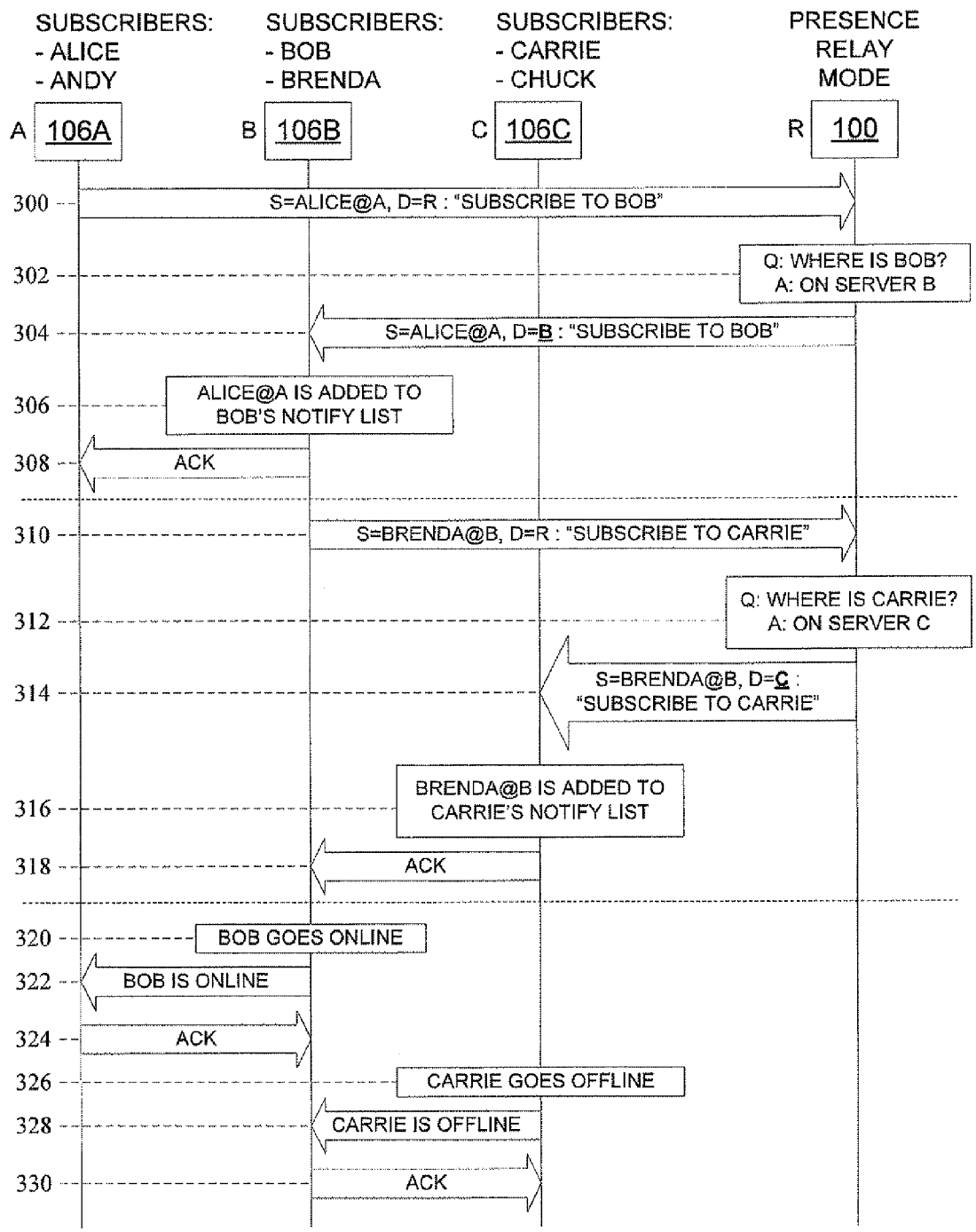
FIG. 3 is a message flow diagram (ladder diagram) illustrating signaling messages exchanged between an exemplary network element 100 operating in presence relay mode according to an embodiment of the subject matter described herein.

FIG. 3 is a message flow diagram (ladder diagram) illustrating signaling messages exchanged between an exemplary network element 100 operating in presence relay mode according to an embodiment of the subject matter described herein. Elements within FIG. 3 correspond to like-numbered elements within FIG. 1A, and their description will therefore not be repeated here. For brevity and ease of explanation, presence information providers 106A, 106B, and 106C are hereinafter respectively referred to as "A", "B", and "C", and NE 100 operating in presence relay mode is hereinafter referred to as "R". For the purposes of this example, A maintains presence information for subscribers Alice and Andy. B maintains presence information for subscribers Bob and Brenda. C maintains presence information for subscribers Carrie and Chuck. The messages and events illustrated in FIG. 3 will now be described with reference to FIGS. 1 and 3.

At 300, a presence-related message sent from A to R. A subscriber within network A 110A, "Alice", requests a subscription to presence-related information regarding user "Bob". The message contains source and destination fields, identified as "S" and "D", respectively. In this example, message 300 indicates that the message came from Alice@A and is addressed to R. At 302, R determines which of A, B, and C maintains presence-related information for Bob, and determines that Bob's presence information is maintained by B. At 304, R relays to B the presence-related message that it received from A, after first modifying the message by changing the value of the destination field from R to B. At 306, B receives the relayed message. Since the message is a request to subscribe Alice@A to receive updates of Bob's presence status, B adds Alice@A to the list of subscribers to be notified of changes to Bob's presence status, referred to as Bob's "notify list". At 308, B sends an ACK message back to the original source of the message, Alice@A.

At 310, another subscriber, Brenda@B, sends a request to subscribe to presence information associated with a user named "Carrie". The request is sent from B to R. At 312, R determines that user Carrie is a subscriber of C, i.e., Carrie's presence information is maintained by C. At 314, R relays to C the presence-related message that it received from B, after first changing the destination field from R to C. At 316, C receives the relayed message. Since the message is a request to subscribe Brenda@B to receive updates of Carrie's presence status, C adds Brenda@B to Carrie's notify list. At 318, C sends an ACK message to Brenda@B.

At 320, Bob's status changes: he goes online. Bob's presence information is maintained by B, and since Alice@A is on Bob's notify list, B sends a presence status update message 322 to Alice@A, which Alice@A acknowledges by sending an ACK message 324 from A to B.

At 326, Carrie's status changes: she goes offline. Carrie's presence information is maintained by C, and since Brenda@B is on Carrie's notify list, C sends a presence status update message 328 to Brenda@B, which Brenda@B acknowledges by sending an ACK message 330 from B to C.

Note that after the presence relay R relays a presence-related message to the proper destination A, B, or C, R has no other involvement with that particular transaction. This is not the case when NE 100 operates in presence proxy mode, which will now be described in FIG. 4, below.

Figure 4:
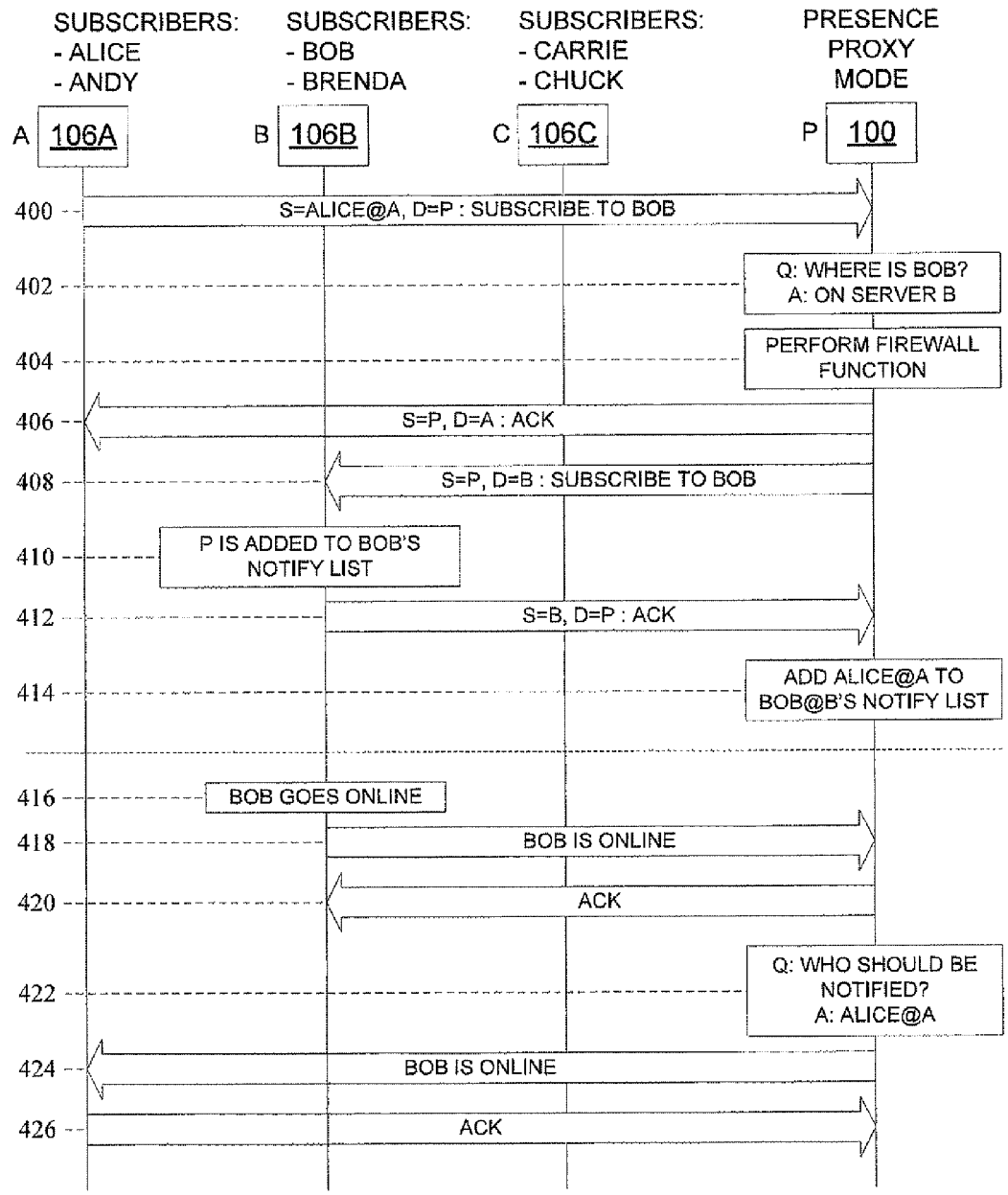
FIG. 4 is a message flow diagram (ladder diagram) illustrating signaling messages exchanged between an exemplary network element 100 operating in presence proxy mode according to an embodiment of the subject matter described herein.

FIG. 4 is a message flow diagram (ladder diagram) illustrating signaling messages exchanged between an exemplary network element 100 operating in presence proxy mode according to an embodiment of the subject matter described herein. For brevity, NE 100 operating in presence proxy mode will hereinafter be referred to as "P". Presence information providers 106A, 106B, and 106C will continue to be respectively referred to as "A", "B", and "C".

At 400, Alice@A requests a subscription to Bob's presence status. This message is sent from A to P. At 402, P determines that Bob's presence information is maintained by B.

In the embodiment illustrated in FIG. 4, at 404, P may perform some firewall function or other valuable functions, such as those described above. At 406, P terminates the request 400 by issuing an ACK message to Alice@A.

At 408, P sends a new subscription request to B. Since the address fields of message 408 indicate that the message source is P and the message destination is B, at 410 B adds P (not A) to Bob's notify list, and sends ACK message 412 to P. At 414, P adds Alice@A to the notify list for Bob@B.

At 416, Bob goes online. At 418, B notifies P that Bob has gone online. In response to receiving the notification message 418, at 420, P sends an acknowledgement message to B. At 422, P determines that Alice@A is subscribed to Bob, and at 424, P notifies Alice@A of the change of Bob's status. At 426, Alice@A sends an acknowledgment message back to P.

Note that in the embodiments illustrated in FIG. 4, P terminates each received message. That is, P responds to received messages with an ACK to the sender of the message. In the embodiments illustrated in FIG. 4, P terminates each message received before proxying each message forward to the intended destination. For example, P receives subscription request 400 and sends ACK 406 back to A before proxying the subscription request 408 forward to B. Likewise, P receives presence status update message 418 and sends an ACK 420 to B before proxying the update message 424 forward to A.

In alternative embodiments, however, P may wait until receiving a response from the final destination of a message before sending the ACK to the original source of the message. For example, in FIG. 4, P might not send message 406 until after P had received message 412. Likewise, P might not send message 420 until after P had received message 426.

Figure 5:
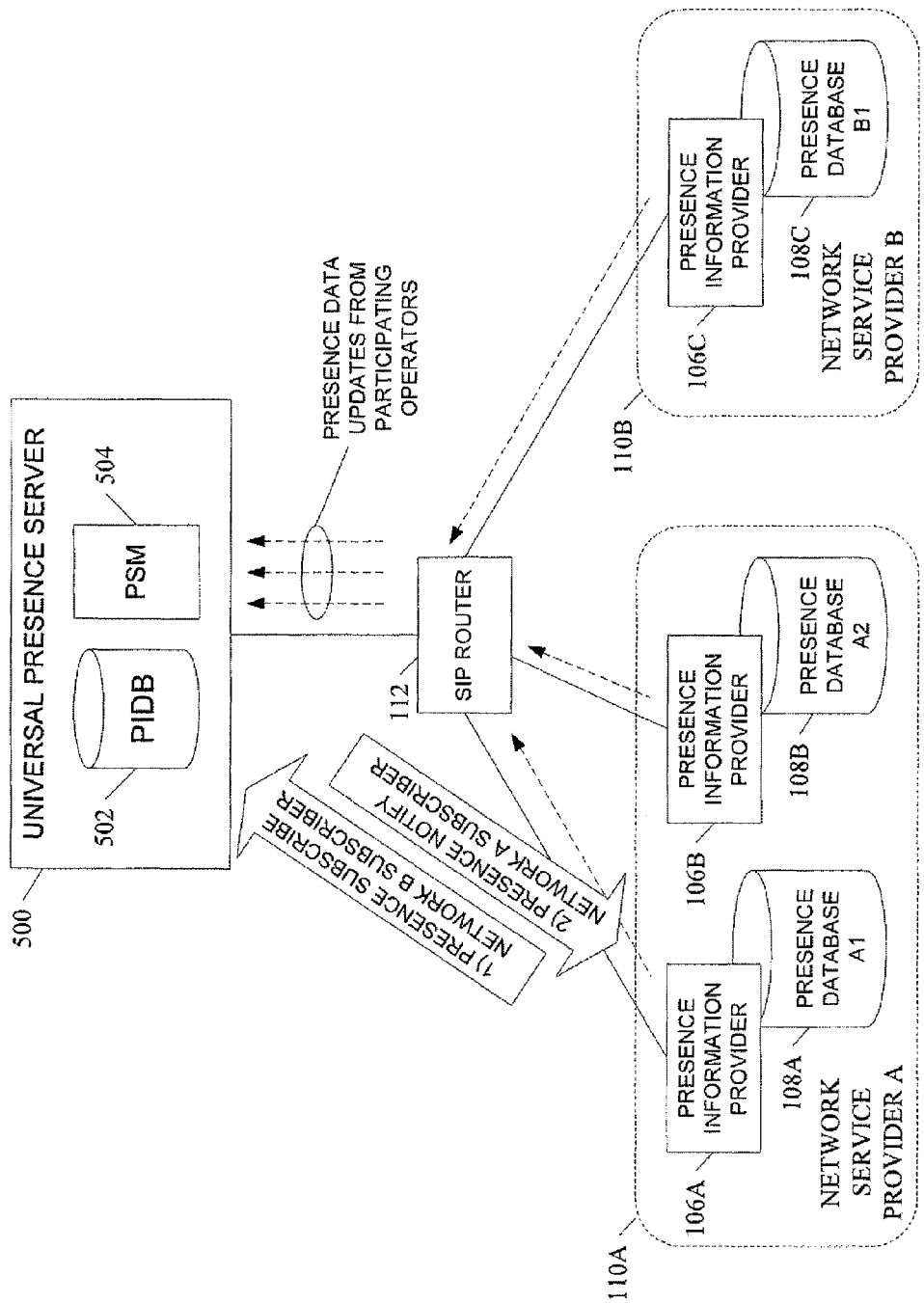
FIG. 5 is a block diagram illustrating a universal presence server for providing presence service using presence information from multiple network service providers according to an embodiment of the subject matter described herein.

FIG. 5 is a block diagram illustrating a universal presence server for providing presence service using presence information from multiple network service providers according to an embodiment of the subject matter described herein. Elements within FIG. 5 correspond to like-numbered elements within FIG. 1A, and their description will therefore not be repeated here. Referring to FIG. 5, in one embodiment, universal presence server 500 may include a presence information database (PIDB) 502 for storing and maintaining presence information collected from multiple presence information providers. For example, in the embodiment illustrated in FIG. 5, presence information providers 106 may send presence data updates (shown as dashed arrows) to universal presence server 500. PIDB 502 may be a database, a table, a spreadsheet, a data structure, a portion of memory, or any other means for storing and retrieving information.

In one embodiment, universal presence server 500 may include a universal presence service module 504 for receiving, from a message source, a first presence-related message, such as message 1 in FIG. 5, that includes information identifying a user, and in response to receiving the first presence-related message, determining whether presence information associated with the identified user exists in PIDB 502. If presence information associated with the identified user exists in PIDB 502, universal presence service module 504 may retrieve the presence information associated with the identified user, and send to the message source a second presence-related message, such as message 2 in FIG. 5, that includes the presence information associated with the identified user. In one embodiment, universal presence service module 504 may be implemented using one or more processors, which may be executing suitable software or firmware programs.

In one embodiment, if presence information associated with the identified user does not exist in PIDB 502, universal presence service module 504 may send a query to at least one of the plurality of presence information providers for presence information associated with the identified user. If a reply is forthcoming, presence service module 504 may communicate the received information to the message source and may also store the received information in PIDB 502.

PIDB 502 may or may not be co-located with universal presence service module 504 or within universal presence server 500. For example, universal presence server 500 may be a telecommunications frame and PIDB 502 may be a database module card within the frame, connected by a local bus. Alternatively, PIDB 502 may be located in a different geographic location from universal presence service module 504, in which case universal presence service module 504 may access PIDB 502 via a network or other remote connection. For example, universal presence service module 504 may access PIDB 502 using a transaction capabilities application part (TCAP) protocol, a mobile application part (MAP) protocol, a simple object access protocol (SOAP), an extended markup language (XML) protocol, a hypertext transfer protocol (HTTP), a session initiation protocol (SIP), or other network protocol suitable for remote access.

Like NE 100, universal presence server 500 may send, receive, or process various types of presence-related messages, including presence registration requests and presence registration request responses, presence status update requests and presence status update responses, presence status queries and presence status query responses, and presence subscription request and presence subscription request responses. Universal presence server 500 may perform additional valuable functions, such as those described above. In alternative embodiments, universal presence server 500 may be, or may be a component of, a SIP router, a SIP application server, an STP, an SCP, or other network entity that can process presence-related messages.

Figure 6:
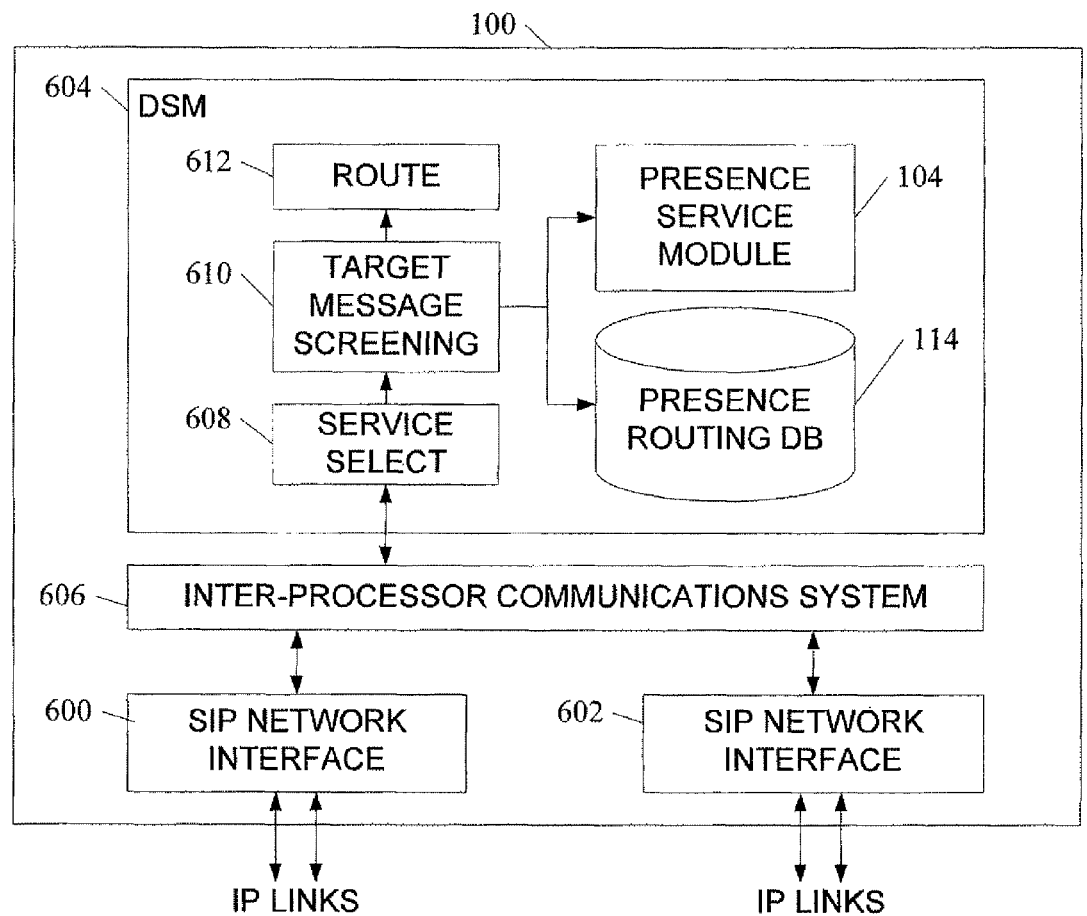
FIG. 6 is a block diagram illustrating an exemplary network entity for providing presence service using presence information from a plurality of presence information providers according to an embodiment of the subject matter described herein.

FIG. 6 is a block diagram illustrating an exemplary network entity for providing presence service using presence information from a plurality of presence information providers according to an embodiment of the subject matter described herein. In one embodiment, NE 100 may be a signal transfer point (STP), a service control point (SCP), a session initiation protocol (SIP) router, or a SIP application server (SAS).

In the embodiment illustrated in FIG. 6, NE 100 may include one or more SIP network interface modules 600 and 602, and a database services module (DSM 604), which communicate with each other via an inter-processor communications system 606. Each module 600, 602, and 604 may include a printed circuit board, an application processor for performing application level processing of signaling messages, and a communications processor for controlling inter-processor communications via inter-processor communications system 606. Inter-processor communications system 606 may be any suitable mechanism for providing message communication between modules 600, 602, and 604. For example, inter-processor communications system 606 may be a bus, an Ethernet LAN, or any other suitable mechanism for providing communications between processors.

In the embodiment illustrated in FIG. 6, SIP network interfaces 600 and 602 may be connected to one or more IP links. One or more of SIP network interfaces 600 or 602 may support the session initiation protocol for instant messaging and presence leveraging extensions (SIMPLE) protocol. In an alternate embodiment, NE 100 may support the extensible messaging and presence protocol (XMPP).

DSM 604 includes various functions and databases for processing signaling messages. In the illustrated example, DSM 604 incorporates the presence service module 104 and presence routing database 114.

Service selection function 608 receives messages from the interface processors and determines the type of service required for each message. For example, service selection function 608 may determine whether further screening of messages is required or whether the messages are simply to be global title translated and routed using route function 612. In one embodiment, service selection function 608 may forward all CAP, INAP, SMS, or USSD messages to target message screening function 610. For example, target message screening function 610 may identify CAP or INAP queries as potentially needing to be directed to presence service module 104. Similarly, target message screening function 610 may identify presence messages as targeted message types that should be directed to presence service module 104. The functions of presence service module 104 and presence routing database 114 are described above, and will therefore not be repeated here. In one embodiment, DSM 604 may implement the firewall functions, authentication functions, translation functions, or any other of the functions described above.

Figure 7:
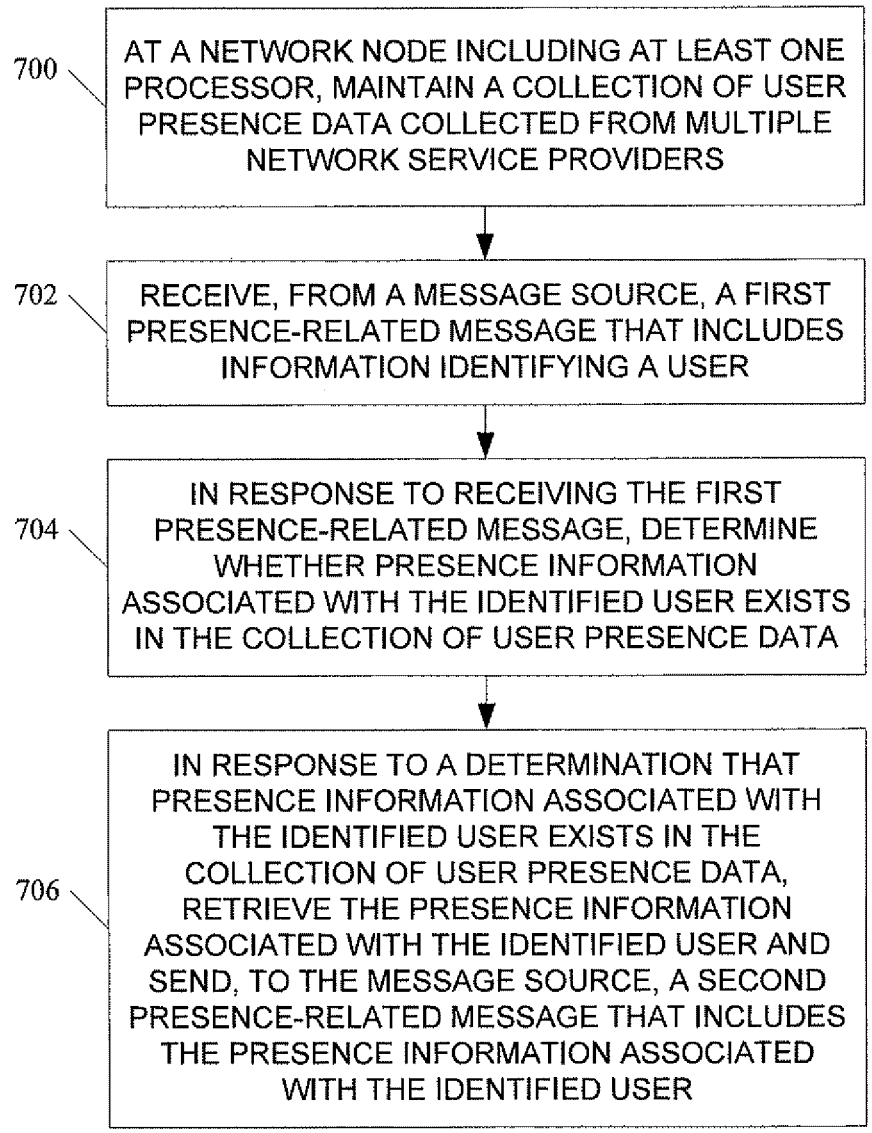
FIG. 7 is a flow chart illustrating an exemplary process for providing presence service using presence information from a plurality of network service providers according to another embodiment of the subject matter described herein.

FIG. 7 is a flow chart illustrating an exemplary process for providing presence service using presence information from a plurality of network service providers according to another embodiment of the subject matter described herein. This process will now be described with reference to FIGS. 5 and 7.

At block 700, a collection of user presence data, collected from multiple network service providers, is maintained at a network node that includes at least one processor. For example, universal presence server 500 may receive presence data updates (FIG. 5, dotted arrows) from network service providers 110A and 110B and maintain the received presence data in presence information database 502. A network service provider may or may not maintain its own presence information. For example, some networks 110 may include their own presence information provider 106 or presence server, but other networks (not shown in FIG. 5) may opt not to maintain any presence information, but instead simply monitor presence updates within its network and report these presence status updates to universal presence server 500.

At block 702, a first presence-related message is received, the message including information identifying a user. For example, universal presence server 500 may receive a presence subscription message (FIG. 5, message 1) from user A, requesting information for user B.

At block 704, in response to receiving the first presence-related message, it is determined whether presence information associated with the identified user exists in the collection of user presence data. For example, presence service module 504 may query PIDB 502 to determine whether it contains presence information for the identified user, e.g., user B.

At block 706, in response to a determination that presence information associated with the identified user exists in the collection of user presence data, the presence information associated with the identified user is retrieved. A second presence-related message, including the presence information associated with the identified user, is sent to the message source. For example, PSM 504 may retrieve presence information for user B and send a presence notification message (FIG. 5, message 2) to the message source, e.g., user A.

In one embodiment, in response to a determination that presence information associated with the identified user does not exist in the presence information database, PSM 504 sends a query for presence information associated with the identified user to one or more of network service providers 110. In response to receiving the requested presence information associated with the identified user, PSM 504 may communicate the requested presence information that it has received to the message source. In one embodiment, universal presence server 500 may store the received presence information in PIDB 502.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing presence service using presence information from a plurality of presence information providers, the method comprising:
    at a network node including at least one processor:
        maintaining, in the network node, a presence routing database storing address information for a plurality of presence information providers, at least some of the presence information providers being associated with different network operators;

receiving, from a message source, a first presence-related message that includes information identifying a user, the message source being a node associated with a first network operator;

using the information identifying a user to identify, from the presence routing database, a presence information provider that is currently maintaining presence information associated with the identified user, the identified presence information provider being associated with a second network operator different from the first network operator; and relaying the first presence-related message to the identified presence information provider or sending a second presence-related message associated with the first presence-related message to the identified presence information provider.

2. The method of claim 1 wherein relaying the first presence-related message includes one of:

forwarding the first presence-related message without modification; and modifying the first presence-related message and forwarding the modified presence-related message.

3. The method of claim 1 comprising receiving, from the identified presence information provider, a third presence-related message that includes presence information associated with the identified user and, in response to receiving the third presence-related message, one of:

relaying the third presence-related message to the message source; and correlating the third presence-related message to the second presence-related message and communicating to the message source the presence information associated with the identified user.

4. The method of claim 3 wherein the third presence-related message comprises one of a presence status update message response, a presence status query response, and a presence subscription request response.

5. The method of claim 3 wherein the identity of the presence information provider is hidden from and not communicated to the message source.

6. The method of claim 1 wherein the first presence-related message comprises one of a session initiation protocol (SIP) message, a session initiation protocol for instant messaging and presence leveraging extensions (SIMPLE) message, and an extensible messaging and presence protocol (XMPP) message.

7. The method of claim 1 wherein the first presence-related message comprises one of a presence status update message, a presence status query, and a presence subscription request.

8. The method of claim 1 wherein identifying the presence information provider includes using E.164 number (ENUM) translation to determine an address of the presence information provider containing presence information associated with the identified user.

9. The method of claim 1 comprising, in response to receiving the first presence-related message, at least one of:

performing an authentication function;
performing an authorization function;
administering service level agreements between a plurality of network operators;
performing an accounting function;
performing a billing function;
performing a billing verification function;
performing a usage measurements function;
performing a protocol conversion function;
performing a network interworking function;
performing a protocol translation function; and
performing an address translation function.

10. The method of claim 1 wherein at least some of the plurality of presence information providers are managed by a same network operator.

11. The method of claim 1 wherein the plurality of presence information providers comprises at least one presence database entity.

12. The method of claim 1 wherein at least one of the plurality of presence information providers comprises a presence server for maintaining presence information for groups of users.

13. The method of claim 1 wherein the first presence-related message is addressed to the network node.

14. A method for providing presence service using presence information from a plurality of network service providers, the method comprising:

at a network node including at least one processor:

maintaining, at the network node, a presence information database containing a collection of user presence data collected from a plurality of different network operators;

receiving, from a message source associated with a first network operator, a first presence-related message that includes information identifying a user;

in response to receiving the first presence-related message, determining whether presence information associated with the identified user exists in the presence information database;

in response to a determination that presence information associated with the identified user exists in the presence information database, retrieving the presence information associated with the identified user and sending, to the message source, a second presence-related message that includes the presence information associated with the identified user, the identified user being a subscriber of a second network operator different from the first network operator.

15. The method of claim 14 comprising in response to a determination that presence information associated with the identified user does not exist in the presence information database, sending a query to at least one of the plurality of network service providers for presence information associated with the identified user, and, in response to receiving a reply to the at least one query, the reply including presence information associated with the identified user, sending to the message source a second presence-related message that includes the presence information associated with the identified user.

16. The method of claim 15 comprising, in response to receiving a reply to the at least one query, storing in the collection of presence data the presence information associated with the identified user.

17. The method of claim 14 wherein the first presence-related message comprises one of a session initiation protocol (SIP) message, a session initiation protocol for instant messaging and presence leveraging extensions (SIMPLE) message, and an extensible messaging and presence protocol (XMPP) message.

18. The method of claim 14 wherein the first presence-related message comprises one of a presence registration request, a presence status update message, a presence status query, and a presence subscription request.

19. The method of claim 14 comprising, in response to receiving the first presence-related message, at least one of:

performing an authentication function;
performing an authorization function;
administering service level agreements between a plurality of network operators;

performing a firewall function;
performing an accounting function;
performing a billing function;
performing a billing verification function;
performing a usage measurements function;
performing a protocol conversion function;
performing a network interworking function;
performing a protocol translation function; and
performing an address translation function.

20. The method of claim 14 wherein maintaining the presence information database includes receiving presence status update messages from the plurality of network service providers.

21. The method of claim 14 wherein at least one of the plurality of network operators includes a presence server for maintaining presence information for groups of users.

22. A network entity for providing presence service using presence information from a plurality of presence information providers, the network entity comprising:
 a presence routing database for storing address information for a plurality of presence information providers, at least some of the presence information providers being associated with different network operators;
 a communications network interface for receiving, from a message source, a first presence-related message that includes information identifying a user, the message source being a node associated with a first network operator; and
 a presence service module, implemented by at least one processor, for receiving the first presence-related message from the communications network interface, using the information identifying a user to identify, from the presence routing database, a presence information provider that is currently maintaining presence information associated with the identified user, the identified presence information provider being associated with a second network operator different from the first network operator, and relaying the first presence-related message to the identified presence information provider or sending a second presence-related message associated with the first presence-related message to the identified presence information provider.

23. The network entity of claim 22 wherein relaying the first presence related message includes one of:
 forwarding the first presence-related message without modification; and
 modifying the first presence-related message and forwarding the modified presence-related message.

24. The network entity of claim 22 wherein, in response to receiving, from the identified presence information provider, a third presence-related message that includes presence information associated with the identified user, the presence service module performs one of:
 relaying the third presence-related message to the message source; and
 correlating the third presence-related message to the second presence-related message and communicating the presence information associated with the identified user to the message source.

25. The network entity of claim 24 wherein the third presence-related message comprises one of a presence status update response, a presence status query response, and a presence subscription request response.

26. The network entity of claim 24 wherein the presence service module hides the identity of the presence information provider from the message source and does not communicate the identity of the presence information provider to the message source.

27. The network entity of claim 22 wherein the first presence-related message comprises one of a session initiation protocol (SIP) message, a session initiation protocol for instant messaging and presence leveraging extensions (SIMPLE) message, and an extensible messaging and presence protocol (XMPP) message.

28. The network entity of claim 22 wherein the first presence-related message comprises one of presence status update message, a presence status query, and a presence subscription request.

29. The network entity of claim 22 wherein the presence service module identifies the presence information provider by using E.164 number (ENUM) translation to determine an address of the presence information provider containing presence information associated with the identified user.

30. The network entity of claim 22 wherein the network entity comprises one of a session initiation protocol (SIP) router, a SIP application server (SAS), a signal transfer point (STP), and a service control point (SCP).

31. The network entity of claim 22 wherein the network entity is configured to, in response to receiving the first presence-related message, at least one of:
 perform an authentication function;
 perform an authorization function;
 administer service level agreements between a plurality of network operators;
 perform an accounting function;
 perform a billing function;
 perform a billing verification function;
 perform a usage measurements function;
 perform a protocol conversion function;
 perform a network interworking function;
 perform a protocol translation function; and
 perform an address translation function.

32. A universal presence server for providing presence service using presence information from a plurality of network service providers, the universal presence server comprising:
 a presence information database for storing and maintaining presence information collected from a plurality of different network operators; and
 a universal presence service module, implemented by at least processor, for:
 receiving, from a message source, a first presence-related message that includes information identifying a user, the message source being a node associated with a first network operator;
 in response to receiving the first presence-related message, determining whether presence information associated with the identified user exists in the presence information database;
 in response to a determination that presence information associated with the identified user exists in the presence information database, retrieving the presence information associated with the identified user and sending to the message source a second presence-related message that includes the presence information associated with the identified user, the identified user being a subscriber of a second network operator different from the first network operator.

33. The universal presence server of claim 32 wherein, in response to a determination that presence information associated with the identified user does not exist in the presence information database, the universal presence service module sends a query for presence information associated with the identified user to at least one of the plurality of network service providers, and wherein, in response to receiving the requested presence information associated with the identified user, the universal presence service module communicates the requested presence information to the message source.

34. The universal presence server of claim 33 wherein, in response to receiving the requested presence information associated with the identified user, the universal presence module stores the requested presence information in the presence information database.

35. The universal presence server of claim 32 wherein the first presence-related message comprises one of a session initiation protocol (SIP) message, a session initiation protocol for instant messaging and presence leveraging extensions (SIMPLE) message, and an extensible messaging and presence protocol (XMPP) message.

36. The universal presence server of claim 32 wherein the first presence-related message comprises one of a presence registration request, a presence status update message, a presence status query and a presence subscription request.

37. The universal presence server of claim 32 wherein the universal presence server comprises one of a session initiation protocol (SIP) router, a SIP application server (SAS), a signal transfer point (STP), and a service control point (SCP).

38. The universal presence server of claim 32 wherein the universal presence service module is configured to, in response to receiving the first presence-related message, at least one of:
- perform an authentication function;
- perform an authorization function;
- administer service level agreements between a plurality of network operators;
- perform an accounting function;
- perform a billing function;
- perform a billing verification function;
- perform a usage measurements function;
- perform a protocol conversion function;
- perform a network interworking function;
- perform a protocol translation function; and
- perform an address translation function.

39. The universal presence server of claim 32 wherein maintaining the presence information database includes receiving presence status update messages from the plurality of network operators and updating the presence information stored in the presence information database.

40. A computer readable medium having stored thereon executable instructions that when executed by the processor of a computer control the computer to perform steps comprising:
at a network node in a telecommunication network:
maintaining, in the network node, a presence routing database storing address information for a plurality of presence information providers, at least some of the presence information providers being associated with different network operators;
receiving, from a message source, a first presence-related message that includes information identifying a user, the message source being a node associated with a first network operator;
using the information identifying a user to identify, from the presence routing database, a presence information provider that is currently maintaining presence information associated with the identified user, the identified presence information provider being associated with a second network operator different from the first network operator; and
relaying the first presence-related message to the identified presence information provider or sending a second presence-related message associated with the first presence-related message to the identified presence information provider.

41. A computer readable medium having stored thereon executable instructions that when executed by the processor of a computer control the computer to perform steps comprising:
at a network node in a telecommunication network:
maintaining, at the network node, a presence information database containing a collection of user presence data collected from a plurality of different network operators;
receiving, from a message source associated with a first network operator, a first presence-related message that includes information identifying a user;
in response to receiving the first presence-related message, determining whether presence information associated with the identified user exists in the presence information database;
in response to a determination that presence information associated with the identified user exists in the presence information database, retrieving the presence information associated with the identified user and sending a second presence-related message to the message source, the second presence-related message that includes the presence information associated with the identified user, the identified user being a subscriber of a second network operator different from the first network operator.

* * * * *